United States Patent [19]
Kudoh

[11] Patent Number: 6,147,153
[45] Date of Patent: *Nov. 14, 2000

[54] PHENOL RESIN MOLDING COMPOSITION AND SLIDING MEMBERS PRODUCED FROM THE SAME

[75] Inventor: Yuji Kudoh, Fukushima, Japan

[73] Assignee: NOK Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/990,806

[22] Filed: Dec. 15, 1997

[30] Foreign Application Priority Data

Dec. 13, 1996 [JP] Japan ................................ 8-352414

[51] Int. Cl.<sup>7</sup> ...................................................... C08K 3/00
[52] U.S. Cl. ............................ 524/494; 524/495; 524/496
[58] Field of Search ...................................... 524/494, 495, 524/496

[56] References Cited

U.S. PATENT DOCUMENTS

| 4,508,855 | 4/1985 | Peters | 523/153 |
| 5,179,145 | 1/1993 | Wright | 524/147 |
| 5,185,195 | 2/1993 | Harpell et al. | 428/102 |
| 5,559,179 | 9/1996 | Mori et al. | 524/494 |

FOREIGN PATENT DOCUMENTS

| 59-155620 | 9/1984 | Japan . |
| 5-311036 | 11/1993 | Japan . |

*Primary Examiner*—Edward J. Cain
*Attorney, Agent, or Firm*—Jacobson, Price, Holman & Stern, PLLC

[57] ABSTRACT

A molding composition comprising a phenol resin, a curing agent for the resin, strands of fiberglass, and graphite. Such a composition is suitable for producing molded slide members having good abrasion resistant properties when used under water-lubricated conditions.

7 Claims, No Drawings

PHENOL RESIN MOLDING COMPOSITION AND SLIDING MEMBERS PRODUCED FROM THE SAME

FIELD OF THE INVENTION

The present invention relates to a phenol resin molding composition. More precisely, it relates to a phenol resin molding composition which is effectively used as a molding material for slide members to be used under water-lubricated conditions.

BACKGROUND OF THE INVENTION

In the case of conventional slide members, such as bearings, which are used in an aqueous environment, the working conditions, including load and sliding speed, are not severe. Therefore, even soft materials, such as tetrafluoroethylene resins and materials with relatively low heat resistance such as polyacetal resins, are satisfactory for such conventional slide members. However, the recent tendency in the art is toward tougher slide members, capable of exhibiting excellent abrasion resistance when used under severe working conditions with higher load while being slid at varying high and low sliding speeds. No satisfactory resin materials for molding into such tougher slide members have heretofore been commercialized in the market.

SUMMARY OF THE INVENTION

The object of the present invention is to provide a resin material capable of being molded into slide members that can exhibit abrasion resistance when used in water-lubricated conditions.

The object of the invention can be attained by a phenolic resin-containing molding material which comprises a phenolic resin, a curing agent for the resin, chopped strands of fiberglass, and graphite.

DESCRIPTION OF PREFERRED EMBODIMENTS

The phenol resin for use in the invention may be any of novolak-type resins and resol-type resins. Preferred are novolak-type resins. Preferably, novolak-type resins to be used in the invention have an average molecular weight of about 1000 to 5000. If their average molecular weight is lower than about 100, the resins have too high fluidity, and will produce many flashes or will be burnt by gas while they are molded. On the other hand, if their average molecular weight is higher than about 5000, the resins have poor fluidity and are generally difficult to mold. The curing agent used for those phenol resins is hexamethylenetetramine or the like. Preferably, the phenol resin composition of the invention comprises about 10 to 30 parts by weight of such a curing agent per 100 parts of the phenol resin. Preferably, the curing agent is previously uniformly mixed with a phenol resin.

Chopped strands of fiberglass present in the composition of the invention may be those prepared by bundling up about 1000 to 30000 strands of fiberglass each having a fiber diameter of from 6 to 30 $\mu$m, preferably from 9 to 13 $\mu$m, with a binder such as epoxy resin, polyvinyl acetate followed by chopping the resulting bundles into strands each having a length of from 1.5 to 6 mm. The phenol resin composition of the invention comprises about 50 to 150 parts by weight, preferably about 75 to 125 parts by weight of the chopped strands per 100 parts by weight of the phenol resin. If the amount of the chopped strands in the composition is smaller than the above-defined range, the molded articles prepared with the composition will not have satisfactory mechanical strength. However, if the amount is larger than the above-defined range, the mechanical strength of the molded articles does not increase.

Chopped strands of carbon fiber or aramide fiber may be used in place of chopped strands of fiberglass. However, chopped strands of fiberglass are preferred for their strength and the cost of the molded articles. If desired, however, such chopped strands of carbon fiber or aramide fiber may be combined with chopped strands of fiberglass in the resin composition of the invention, provided they do not have any negative influence on the molded articles of the composition.

Graphite used in the composition may be natural graphite obtained by smelting metamorphite, such as crystallized limestone or gneiss, to produce a graphitic residue which is subsequently ground; or artificial graphite produced by shaping oil coke with a tar pitch binder followed by graphitizing it at a high temperature of about 2000° C. or higher. Of those, preferred is a graphite having a mean grain size of about 1 to 200 $\mu$m. Artificial graphite is more preferred. The graphite may be in the phenol resin composition in an amount of about 20 to 100 parts by weight, preferably about 30 to 70 parts by weight, per 100 parts by weight of the phenol resin. If the graphite content is smaller than the defined range, the molded articles of the composition could not be satisfactorily slidable in the water-lubricated conditions. If the graphite content is larger than the defined range, not only is the cost of the composition increased but also the mechanical strength of the molded articles of the composition is greatly lowered.

In addition to the components mentioned above, the composition may optionally contain a coupling agent of, for example, silane compounds, titanate compounds or aluminum compounds, a colorant, a curing promoter, a lubricant, etc., if desired. The preferred coupling agent is an aminosilane compound. In general, the composition may contain about 0.1 to 2 parts by weight of a coupling agent per 100 parts by weight of fiberglass.

The molding material of the invention is produced by first kneading a phenolic resin with other constituent components, then cooling the resulting mixture, and grinding it in a milling grinder. The thus-produced molding material then undergoes injection molding, transfer molding or the like.

The phenol resin-containing molding material of the invention is effectively molded into slide members such as bearings and washers, which exhibit excellent abrasion resistance when used under water-lubricated conditions while being slid at a high speed under a high load.

The invention is now described in detail, with reference to the following Example, which, however, is not intended to restrict the scope of the invention.

EXAMPLE (1) A composition comprising 100 parts by weight of novolak-phenolic resin (PR311, product of Sumitomo Durez) but not containing a fibrous filler (No. 1); a composition comprising 100 parts by weight of the same resin and containing 100 parts by weight of PAN carbon fiber (HTA-C3-E, product of Toho Rayon, having a fiber diameter of 7 $\mu$m, a fiber length of 3 mm and a specific gravity of 1.77) (No. 2); and a composition comprising 100 parts by weight of the same resin and containing 170 parts by weight of chopped strands of fiberglass (having a fiber diameter of 9

μm, a fiber length of 3 mm and a specific gravity of 2.55) (No. 3) were prepared. Molded articles of those compositions were tested under the conditions mentioned below, according to JIS K-7218A, to measure their limiting PV value.

Lubricating system: water circulation

Amount of water: 168 liters/hr

Surface pressure: 0.245, 0.49, 0.98, 1.96 or 2.94 MPa

Peripheral velocity: at highest 7.2 m/sec

Counterpart: 90 MnV9 (steel alloy tool)

Ra=0.3 to 1.0 μm

In the friction test where each sample was rotated under a pre-determined load (surface pressure) in the water-lubricated condition mentioned above, with increasing the rotating speed, the surface pressure P and the peripheral velocity V at which the friction factor suddenly increased to reach the serviceability limit were measured. From those, obtained was the limiting PV value (unit: MPa m/sec) by multiplying P by V, which was as follows:

| Surface Pressure (MPa) | No. 1 | No. 2 | No. 3 |
| --- | --- | --- | --- |
| 0.245 | >1.76 | >1.76 | >1.76 |
| 0.49 | >3.53 | >3.53 | >3.53 |
| 0.98 | 2.92 | >7.06 | >7.06 |
| 1.96 | — | 9.41 | 14.1 |
| 2.94 | — | — | 5.26 |

(2) The following components were added to 100 parts by weight of the phenol resin used in (1), and molded into test pieces to be used for measuring their limiting PV value.

| | |
| --- | --- |
| No. 4: | |
| Above-mentioned chopped strands of fiberglass | 170 parts by weight |
| No. 5: | |
| Above-mentioned chopped strands of fiberglass | 100 parts by weight |
| Artificial graphite (AT-10, product of Oriental Industry, having a mean grain size of 17 μm and a specific gravity of 2.2) | 50 parts by weight |
| No. 6: | |
| Above-mentioned chopped strands of fiberglass | 100 parts by weight |
| Above-mentioned PAN carbon fiber | 40 parts by weight |
| No. 7: | |
| Above-mentioned chopped strands of fiberglass | 100 parts by weight |
| Oil coke (CMW-200, product of Chuetsu Graphite, 99% passed through 200-mesh and having a specific gravity of 2.04) | 50 parts by weight |
| No. 8: | |
| Above-mentioned chopped strands of fiberglass | 100 parts by weight |
| Potassium titanate whiskers (Tismo D, product of Otsuka Chemical) | 50 parts by weight |
| No. 9: | |
| Above-mentioned chopped strands of fiberglass | 100 parts by weight |
| Glass beads (UB-47LLA, product of Union, having a grain size of 63 to 106 μm and a specific gravity of 2.50) | 50 parts by weight |
| No. 10: | |
| Above-mentioned chopped strands of fiberglass | 75 parts by weight |
| Aramide fiber (T-322EH, product of Teijin, having a fiber diameter of 12 μm and a fiber length of 1 mm) | 45 parts by weight |
| No. 11: | |
| Above-mentioned chopped strands of fiberglass | 100 parts by weight |
| Glass powder (having average fiber length 70 μm and fiber diameter 10 μm) | 50 parts by weight |

The limiting PV value (unit: MPa m/sec) of those samples was measured in the same manner as in (1). In this, however, the amount of water was 11 liters/hr, the surface pressure was 0.80, 1.72 or 2.45 MPa and the peripheral velocity was at highest 8.4 m/sec.

| Sample No. | Surface Pressure 0.80 MPa | Surface Pressure 1.72 MPa | Surface Pressure 2.45 MPa |
| --- | --- | --- | --- |
| No. 4 | >6.72 | 2.96 | 6.00 |
| No. 5 | >6.72 | >14.4 | >20.6 |
| No. 6 | >6.72 | 9.29 | 13.2 |
| No. 7 | >6.72 | 13.4 | 11.8 |
| No. 8 | >6.72 | 3.10 | 4.41 |
| No. 9 | >6.72 | 4.13 | 7.35 |
| No. 10 | >6.72 | 6.19 | 2.94 |
| No. 11 | >6.72 | 8.26 | 7.35 |

(3) The results verify the following:

The data of Nos. 1 to 3 indicate that the friction characteristic of molded articles comprising ordinary reinforcing fiber, fiberglass or carbon fiber, is better than that of molded articles made from phenol resin only. In particular, molded articles comprising fiberglass are excellent.

The data of No. 4 indicate that the friction characteristic of the combination of phenol resin and fiberglass only greatly depends on the running velocity and that molded articles of that combination are not applicable to wide-range use under high load.

The data of Nos. 5 and 6 and those of Nos. 7 to 11 indicate that molded articles of compositions comprising phenolic resin, fiberglass and carbon filler have a higher limiting point under water-lubricated conditions than those of compositions comprising any other filler, and that molded articles of compositions comprising both fiberglass and graphite have especially excellent characteristics.

While the invention has been described in detail and with reference to specific embodiments thereof, it will be apparent to one skilled in the art that various changes and modifications can be made therein without departing from the spirit and scope thereof.

What is claimed is:

1. A method of using a slide member comprising the following steps;

placing a member, including a phenol resin, a curing agent for the resin, strands of fiberglass, and graphite, with said strands of fiberglass being in the range of about 50 to about 150 parts by weight and with said graphite being in the range of about 20 to about 100 parts by weight based on 100 parts by weight of phenol resin, in an aqueous fluid for use as a water-lubricated slide member.

2. The method of using the slide member according to claim 1, wherein the phenol resin has a weight average molecular weight within the range of about 1000 to about 5000.

3. The method of using the slide member according to claim 1, wherein the phenol resin is a novolak-type resin.

4. The method of using the slide member according to claim 1, wherein the amount of the strands of fiberglass is in the range of about 75 to 125 parts by weight based on 100 parts by weight of phenol resin.

5. The method of using the slide member according to claim 1, wherein the amount of the strands of graphite is in the range of about 30 to 70 parts by weight based on 100 parts by weight of phenol resin.

6. The method of using the slide member according to claim 1, wherein the graphite has a mean grain size of about 1 to about 200 $\mu$m.

7. The method of using he slide member according to claim 1, wherein molding of the member is executed by injection molding or transfer molding.

* * * * *